US012282816B1

United States Patent
O'Shea et al.

(10) Patent No.: US 12,282,816 B1
(45) Date of Patent: Apr. 22, 2025

(54) CARDS, DEVICES, EMV CONTACTS, AND METHODS OF MANUFACTURING CARDS, DEVICES AND EMV CONTACTS (71) Applicant: Dynamics Inc., Cheswick, PA (US)

(72) Inventors: Norman E. O'Shea, Seven Fields, PA (US); W. Barry Brown, Cheswick, PA (US); Jeffrey D. Mullen, Pittsburgh, PA (US); Geoffrey D. Shippee, Edgeworth, PA (US)

(73) Assignee: Dynamics Inc., Cheswick, PA (US)

( * ) Notice: Subject to any disclaimer, the term of this patent is extended or adjusted under 35 U.S.C. 154(b) by 0 days.

(21) Appl. No.: 14/472,827

(22) Filed: Aug. 29, 2014

Related U.S. Application Data (60) Provisional application No. 61/876,208, filed on Sep. 10, 2013.

(51) Int. Cl.
*G06K 19/02* (2006.01)
*G06K 19/077* (2006.01)

(52) U.S. Cl.
CPC . *G06K 19/07743* (2013.01); *G06K 19/07722* (2013.01)

(58) Field of Classification Search
CPC ............. G06K 19/077; G06K 19/07743
USPC .................... 235/487, 488, 492
See application file for complete search history.

(56) References Cited

U.S. PATENT DOCUMENTS 4,288,139 A * 9/1981 Cobaugh ........... H01R 12/89
439/267

| 4,353,064 A | 10/1982 | Stamm |
| 4,394,654 A | 7/1983 | Hofmann-Cerfontaine |
| 4,614,861 A | 9/1986 | Pavlov et al. |
| 4,667,087 A | 5/1987 | Quintana |
| 4,701,601 A | 10/1987 | Francini et al. |
| 4,720,860 A | 1/1988 | Weiss |

(Continued)

FOREIGN PATENT DOCUMENTS

JP 05210770 A 8/1993
WO WO9852735 11/1998

(Continued)

OTHER PUBLICATIONS

U.S. Appl. No. 60/594,300, Poidomani et al.

(Continued)

*Primary Examiner* — Daniel St Cyr
(74) *Attorney, Agent, or Firm* — Morris Law Group; Robert W. Morris (57) ABSTRACT

A flexible device, such as a powered card or processor based system, may include a connector array. The connector array may be a contact connector such as an EMV connector. The connector array may include discrete connectors connected to landing pads of a circuit board. The discrete connectors may be exposed on a surface of the flexible device, and may be arranged in rows and columns. The discrete connectors may be formed using vias and by introducing material into the vias. A mask may be used to extend a level of the discrete connectors above an outer layer of the flexible device. A personalization layer may be applied to the flexible device to about a level of an outer surface of the connector. The flexible device may be programmed and tested during the application of the personalization layer.

6 Claims, 4 Drawing Sheets

(56) References Cited

U.S. PATENT DOCUMENTS

| | | | |
|---|---|---|---|
| 4,766,480 A * | 8/1988 | Hamada | G06K 19/07743 |
| | | | 257/679 |
| 4,786,791 A | 11/1988 | Hodama | |
| 4,791,283 A | 12/1988 | Burkhardt | |
| 4,797,542 A | 1/1989 | Hara | |
| 5,038,251 A | 8/1991 | Sugiyama et al. | |
| 5,168,520 A | 12/1992 | Weiss | |
| 5,229,652 A * | 7/1993 | Hough | G06F 13/4068 |
| | | | 307/104 |
| 5,237,614 A | 8/1993 | Weiss | |
| 5,276,311 A | 1/1994 | Hennige | |
| 5,347,580 A | 9/1994 | Molva et al. | |
| 5,361,062 A | 11/1994 | Weiss et al. | |
| 5,412,199 A | 5/1995 | Finkelstein et al. | |
| 5,434,398 A | 7/1995 | Goldberg | |
| 5,434,405 A | 7/1995 | Finkelstein et al. | |
| 5,478,994 A | 12/1995 | Rahman | |
| 5,479,512 A | 12/1995 | Weiss | |
| 5,484,997 A | 1/1996 | Haynes | |
| 5,485,519 A | 1/1996 | Weiss | |
| 5,585,787 A | 12/1996 | Wallerstein | |
| 5,591,949 A | 1/1997 | Bernstein | |
| 5,608,203 A | 3/1997 | Finkelstein et al. | |
| 5,623,552 A | 4/1997 | Lane | |
| 5,657,388 A | 8/1997 | Weiss | |
| 5,834,747 A | 11/1998 | Cooper | |
| 5,834,756 A | 11/1998 | Gutman et al. | |
| 5,856,661 A | 1/1999 | Finkelstein et al. | |
| 5,864,623 A | 1/1999 | Messina et al. | |
| 5,907,142 A | 5/1999 | Kelsey | |
| 5,913,203 A | 6/1999 | Wong et al. | |
| 5,937,394 A | 8/1999 | Wong et al. | |
| 5,955,021 A | 9/1999 | Tiffany, III | |
| 5,956,699 A | 9/1999 | Wong et al. | |
| 6,025,054 A | 2/2000 | Tiffany, III | |
| 6,045,043 A | 4/2000 | Bashan et al. | |
| 6,076,163 A | 6/2000 | Hoffstein et al. | |
| 6,085,320 A | 7/2000 | Kaliski | |
| 6,095,416 A | 8/2000 | Grant et al. | |
| 6,130,621 A | 10/2000 | Weiss | |
| 6,145,079 A | 11/2000 | Mitty et al. | |
| 6,157,920 A | 12/2000 | Jakobsson et al. | |
| 6,161,181 A | 12/2000 | Haynes, III et al. | |
| 6,176,430 B1 | 1/2001 | Finkelstein et al. | |
| 6,182,894 B1 | 2/2001 | Hackett et al. | |
| 6,189,098 B1 | 2/2001 | Kaliski | |
| 6,199,052 B1 | 3/2001 | Mitty et al. | |
| 6,206,293 B1 | 3/2001 | Gutman et al. | |
| 6,240,184 B1 | 5/2001 | Huynh et al. | |
| 6,241,153 B1 | 6/2001 | Tiffany, III | |
| 6,256,873 B1 | 7/2001 | Tiffany, III | |
| 6,269,163 B1 | 7/2001 | Rivest et al. | |
| 6,286,022 B1 | 9/2001 | Kaliski et al. | |
| 6,308,890 B1 | 10/2001 | Cooper | |
| 6,313,724 B1 | 11/2001 | Osterweil | |
| 6,389,442 B1 | 5/2002 | Yin et al. | |
| 6,393,447 B1 | 5/2002 | Jakobsson et al. | |
| 6,411,715 B1 | 6/2002 | Liskov et al. | |
| 6,446,052 B1 | 9/2002 | Juels | |
| 6,460,141 B1 | 10/2002 | Olden | |
| 6,592,044 B1 | 7/2003 | Wong et al. | |
| 6,607,127 B2 | 8/2003 | Wong | |
| 6,609,654 B1 | 8/2003 | Anderson et al. | |
| 6,631,849 B2 | 10/2003 | Blossom | |
| 6,655,585 B2 | 12/2003 | Shinn | |
| 6,681,988 B2 | 1/2004 | Stack et al. | |
| 6,705,520 B1 | 3/2004 | Pitroda et al. | |
| 6,755,341 B1 | 6/2004 | Wong et al. | |
| 6,764,005 B2 | 7/2004 | Cooper | |
| 6,769,618 B1 | 8/2004 | Finkelstein | |
| 6,805,288 B2 | 10/2004 | Routhenstein et al. | |
| 6,811,082 B2 | 11/2004 | Wong | |
| 6,813,354 B1 | 11/2004 | Jakobsson et al. | |
| 6,817,532 B2 | 11/2004 | Finkelstein | |
| 6,873,974 B1 | 3/2005 | Schutzer | |
| 6,902,116 B2 | 6/2005 | Finkelstein | |
| 6,970,070 B2 | 11/2005 | Juels et al. | |
| 6,980,969 B1 | 12/2005 | Tuchler et al. | |
| 6,985,583 B1 | 1/2006 | Brainard et al. | |
| 6,991,155 B2 | 1/2006 | Burchette, Jr. | |
| 7,013,030 B2 | 3/2006 | Wong et al. | |
| 7,035,443 B2 | 4/2006 | Wong | |
| 7,039,223 B2 | 5/2006 | Wong | |
| 7,044,394 B2 | 5/2006 | Brown | |
| 7,051,929 B2 | 5/2006 | Li | |
| 7,083,094 B2 | 8/2006 | Cooper | |
| 7,100,049 B2 | 8/2006 | Gasparini et al. | |
| 7,100,821 B2 | 9/2006 | Rasti | |
| 7,111,172 B1 | 9/2006 | Duane et al. | |
| 7,114,652 B2 | 10/2006 | Moullette et al. | |
| 7,136,514 B1 | 11/2006 | Wong | |
| 7,140,550 B2 | 11/2006 | Ramachandran | |
| 7,163,153 B2 | 1/2007 | Blossom | |
| 7,195,154 B2 | 3/2007 | Routhenstein | |
| 7,197,639 B1 | 3/2007 | Juels et al. | |
| 7,219,368 B2 | 5/2007 | Juels et al. | |
| 7,225,537 B2 | 6/2007 | Reed | |
| 7,225,994 B2 | 6/2007 | Finkelstein | |
| 7,246,752 B2 | 7/2007 | Brown | |
| 7,298,243 B2 | 11/2007 | Juels et al. | |
| 7,334,732 B2 | 2/2008 | Cooper | |
| 7,337,326 B2 | 2/2008 | Palmer et al. | |
| 7,346,775 B2 | 3/2008 | Gasparini et al. | |
| 7,356,696 B1 | 4/2008 | Jakobsson et al. | |
| 7,357,319 B1 | 4/2008 | Lin et al. | |
| 7,359,507 B2 | 4/2008 | Kaliski | |
| 7,360,688 B1 | 4/2008 | Harris | |
| 7,363,494 B2 | 4/2008 | Brainard et al. | |
| 7,380,710 B2 | 6/2008 | Brown | |
| 7,398,253 B1 | 7/2008 | Pinnell | |
| 7,404,087 B2 | 7/2008 | Teunen | |
| 7,424,570 B2 | 9/2008 | D'Albore et al. | |
| 7,427,033 B1 | 9/2008 | Roskind | |
| 7,454,349 B2 | 11/2008 | Teunen et al. | |
| 7,461,250 B1 | 12/2008 | Duane et al. | |
| 7,461,399 B2 | 12/2008 | Juels et al. | |
| 7,472,093 B2 | 12/2008 | Juels | |
| 7,472,829 B2 | 1/2009 | Brown | |
| 7,494,055 B2 | 2/2009 | Fernandes et al. | |
| 7,502,467 B2 | 3/2009 | Brainard et al. | |
| 7,502,933 B2 | 3/2009 | Jakobsson et al. | |
| 7,503,485 B1 | 3/2009 | Routhenstein | |
| 7,516,492 B1 | 4/2009 | Nisbet et al. | |
| 7,523,301 B2 | 4/2009 | Nisbet et al. | |
| 7,530,495 B2 | 5/2009 | Cooper | |
| 7,532,104 B2 | 5/2009 | Juels | |
| 7,543,739 B2 | 6/2009 | Brown et al. | |
| 7,559,464 B2 | 7/2009 | Routhenstein | |
| 7,562,221 B2 | 7/2009 | Nystrom et al. | |
| 7,562,222 B2 | 7/2009 | Gasparini et al. | |
| 7,580,898 B2 | 8/2009 | Brown et al. | |
| 7,584,153 B2 | 9/2009 | Brown et al. | |
| 7,591,426 B2 | 9/2009 | Osterweil et al. | |
| 7,591,427 B2 | 9/2009 | Osterweil | |
| 7,602,904 B2 | 10/2009 | Juels et al. | |
| 7,631,804 B2 | 12/2009 | Brown | |
| 7,639,537 B2 | 12/2009 | Sepe et al. | |
| 7,641,124 B2 | 1/2010 | Brown et al. | |
| 7,660,902 B2 | 2/2010 | Graham et al. | |
| 7,673,080 B1 * | 3/2010 | Yu | G06F 13/387 |
| | | | 711/115 |
| 7,828,207 B2 | 11/2010 | Cooper | |
| 8,020,775 B2 * | 9/2011 | Mullen et al. | |
| 8,132,062 B2 * | 3/2012 | Stolero | G06F 11/267 |
| | | | 714/718 |
| 8,308,062 B1 * | 11/2012 | Walton, III | G16H 10/65 |
| | | | 235/380 |
| 9,010,647 B2 * | 4/2015 | Workley | G06K 19/073 |
| | | | 235/487 |
| 9,117,153 B2 * | 8/2015 | Launay | G06K 19/073 |
| 2001/0034702 A1 | 10/2001 | Mockett et al. | |
| 2001/0047335 A1 | 11/2001 | Arndt et al. | |
| 2002/0059114 A1 | 5/2002 | Cockrill et al. | |
| 2002/0082989 A1 | 6/2002 | Fife et al. | |

(56) References Cited

U.S. PATENT DOCUMENTS

| | | | |
|---|---|---|---|
| 2002/0090842 A1* | 7/2002 | Boakes | H05K 3/4015 439/67 |
| 2002/0096570 A1 | 7/2002 | Wong et al. | |
| 2002/0120583 A1 | 8/2002 | Keresman, III et al. | |
| 2003/0034388 A1 | 2/2003 | Routhenstein et al. | |
| 2003/0052168 A1 | 3/2003 | Wong | |
| 2003/0057278 A1 | 3/2003 | Wong | |
| 2003/0116635 A1 | 6/2003 | Taban | |
| 2003/0152253 A1 | 8/2003 | Wong | |
| 2003/0163287 A1 | 8/2003 | Vock et al. | |
| 2003/0173409 A1 | 9/2003 | Vogt et al. | |
| 2003/0179909 A1 | 9/2003 | Wong et al. | |
| 2003/0179910 A1 | 9/2003 | Wong | |
| 2003/0226899 A1 | 12/2003 | Finkelstein | |
| 2004/0035942 A1 | 2/2004 | Silverman | |
| 2004/0069853 A1* | 4/2004 | Aharonson | G06K 19/0728 235/454 |
| 2004/0124246 A1* | 7/2004 | Allen | G07F 7/1008 235/492 |
| 2004/0133787 A1* | 7/2004 | Doughty | G07F 7/1075 713/186 |
| 2004/0162732 A1 | 8/2004 | Rahim et al. | |
| 2004/0172535 A1 | 9/2004 | Jakobsson | |
| 2004/0177045 A1 | 9/2004 | Brown | |
| 2005/0043997 A1 | 2/2005 | Sohata et al. | |
| 2005/0080747 A1 | 4/2005 | Anderson et al. | |
| 2005/0086160 A1 | 4/2005 | Wong et al. | |
| 2005/0086177 A1 | 4/2005 | Anderson et al. | |
| 2005/0116026 A1 | 6/2005 | Burger et al. | |
| 2005/0119940 A1 | 6/2005 | Concilio et al. | |
| 2005/0125584 A1* | 6/2005 | Pinto | G06F 13/385 710/301 |
| 2005/0154643 A1 | 7/2005 | Doan et al. | |
| 2005/0228959 A1 | 10/2005 | D'Albore et al. | |
| 2006/0000900 A1 | 1/2006 | Fernandes et al. | |
| 2006/0037073 A1 | 2/2006 | Juels et al. | |
| 2006/0041759 A1 | 2/2006 | Kaliski et al. | |
| 2006/0085328 A1 | 4/2006 | Cohen et al. | |
| 2006/0091223 A1 | 5/2006 | Zellner | |
| 2006/0161435 A1 | 7/2006 | Atef et al. | |
| 2006/0163353 A1 | 7/2006 | Moulette et al. | |
| 2006/0174104 A1 | 8/2006 | Crichton et al. | |
| 2006/0196931 A1 | 9/2006 | Holtmanns et al. | |
| 2006/0256961 A1 | 11/2006 | Brainard et al. | |
| 2007/0034700 A1 | 2/2007 | Poidomani et al. | |
| 2007/0114274 A1 | 5/2007 | Gibbs et al. | |
| 2007/0124321 A1 | 5/2007 | Szydlo | |
| 2007/0152070 A1 | 7/2007 | D'Albore | |
| 2007/0152072 A1 | 7/2007 | Frallicciardi et al. | |
| 2007/0153487 A1 | 7/2007 | Frallicciardi et al. | |
| 2007/0174614 A1 | 7/2007 | Duane et al. | |
| 2007/0192249 A1 | 8/2007 | Biffle et al. | |
| 2007/0241183 A1 | 10/2007 | Brown et al. | |
| 2007/0241201 A1 | 10/2007 | Brown et al. | |
| 2007/0256123 A1 | 11/2007 | Duane et al. | |
| 2007/0291753 A1 | 12/2007 | Romano | |
| 2008/0005510 A1 | 1/2008 | Sepe et al. | |
| 2008/0008315 A1 | 1/2008 | Fontana et al. | |
| 2008/0008322 A1 | 1/2008 | Fontana et al. | |
| 2008/0010675 A1 | 1/2008 | Massacusa et al. | |
| 2008/0016351 A1 | 1/2008 | Fontana et al. | |
| 2008/0019507 A1 | 1/2008 | Fontana et al. | |
| 2008/0028447 A1 | 1/2008 | O'Malley et al. | |
| 2008/0040271 A1 | 2/2008 | Hammad et al. | |
| 2008/0040276 A1 | 2/2008 | Hammad et al. | |
| 2008/0058016 A1 | 3/2008 | Di Maggio et al. | |
| 2008/0059379 A1 | 3/2008 | Ramaci et al. | |
| 2008/0096326 A1 | 4/2008 | Reed | |
| 2008/0126398 A1 | 5/2008 | Cimino | |
| 2008/0128515 A1 | 6/2008 | Di Iorio | |
| 2008/0148394 A1 | 6/2008 | Poidomani et al. | |
| 2008/0201264 A1 | 8/2008 | Brown et al. | |
| 2008/0209550 A1 | 8/2008 | Di Iorio | |
| 2008/0288699 A1 | 11/2008 | Chichierchia | |
| 2008/0294930 A1 | 11/2008 | Varone et al. | |
| 2008/0302877 A1 | 12/2008 | Musella et al. | |
| 2009/0013122 A1 | 1/2009 | Sepe et al. | |
| 2009/0036147 A1 | 2/2009 | Romano | |
| 2009/0046522 A1 | 2/2009 | Sepe et al. | |
| 2009/0108064 A1 | 4/2009 | Fernandes et al. | |
| 2009/0150295 A1 | 6/2009 | Hatch et al. | |
| 2009/0152365 A1 | 6/2009 | Li et al. | |
| 2009/0242648 A1 | 10/2009 | Di Sirio et al. | |
| 2009/0244858 A1 | 10/2009 | Di Sirio et al. | |
| 2009/0253460 A1 | 10/2009 | Varone et al. | |
| 2009/0255996 A1 | 10/2009 | Brown et al. | |
| 2009/0290704 A1 | 11/2009 | Cimino | |
| 2009/0303885 A1 | 12/2009 | Longo | |
| 2011/0028184 A1 | 2/2011 | Cooper | |
| 2011/0062239 A1* | 3/2011 | Lau | G06K 19/06206 257/679 |
| 2011/0090277 A1* | 4/2011 | Pomerantz | B41J 2/04545 347/20 |
| 2012/0081860 A1* | 4/2012 | Pomerantz | G06K 19/07 361/728 |
| 2012/0292395 A1* | 11/2012 | Huang | G07F 7/1008 235/492 |
| 2013/0008968 A1* | 1/2013 | Launay | G06K 19/073 29/874 |
| 2013/0186960 A1* | 7/2013 | Suzuki | H05K 1/0259 235/492 |
| 2014/0226293 A1* | 8/2014 | Sato | G06K 19/07769 361/752 |
| 2014/0374757 A1* | 12/2014 | Sugimura | H01L 23/544 257/676 |
| 2021/0073697 A1* | 3/2021 | Paranjape | G06Q 10/0639 |

FOREIGN PATENT DOCUMENTS

| | | |
|---|---|---|
| WO | WO0247019 | 6/2002 |
| WO | WO06066322 | 6/2006 |
| WO | WO06080929 | 8/2006 |
| WO | WO06105092 | 10/2006 |
| WO | WO06116772 | 11/2006 |
| WO | WO08064403 | 6/2008 |

OTHER PUBLICATIONS

U.S. Appl. No. 60/675,388, Poidomani et al.
The Bank Credit Card Business. Second Edition, American Bankers Association, Washington, D.C., 1996.
A Day in the Life of a Flux Reversal. http://www.phrack.org/issues.html?issue=37&id=6#article As viewed on Apr. 12, 2010.
Dynamic Virtual Credit Card Numbers. http://homes.cerias.purdue.edu/~jtli/paper/fc07.pdf. As viewed on Apr. 12, 2010.
English translation of JP 05210770 A.

\* cited by examiner

CARDS, DEVICES, EMV CONTACTS, AND METHODS OF MANUFACTURING CARDS, DEVICES AND EMV CONTACTS

CROSS-REFERENCE TO RELATED APPLICATION

This application claims the benefit of U.S. Provisional Patent Application No. 61/876,208, titled "CARDS, DEVICES, EMV CONTACTS, AND METHODS OF MANUFACTURING CARDS, DEVICES AND EMV CONTACTS," filed Sep. 10, 2013, which is hereby incorporated by reference herein in its entirety.

BACKGROUND OF THE INVENTION

This invention relates to powered cards and devices and related systems.

SUMMARY OF THE INVENTION

According to some example embodiments, a card may include a connector array including a plurality of discrete connectors exposed on a surface of the card. The discrete connectors of the connector array may be arranged in rows and columns. The discrete connectors may be separated by at least a personalization layer.

According to some example embodiments, a method may include applying a personalization layer to a card; and programming the card during the applying a personalization layer.

According to some example embodiments a method may include applying a personalization layer to a card, and testing the card during the applying a personalization layer. The card may be tested during the applying a personalization layer.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
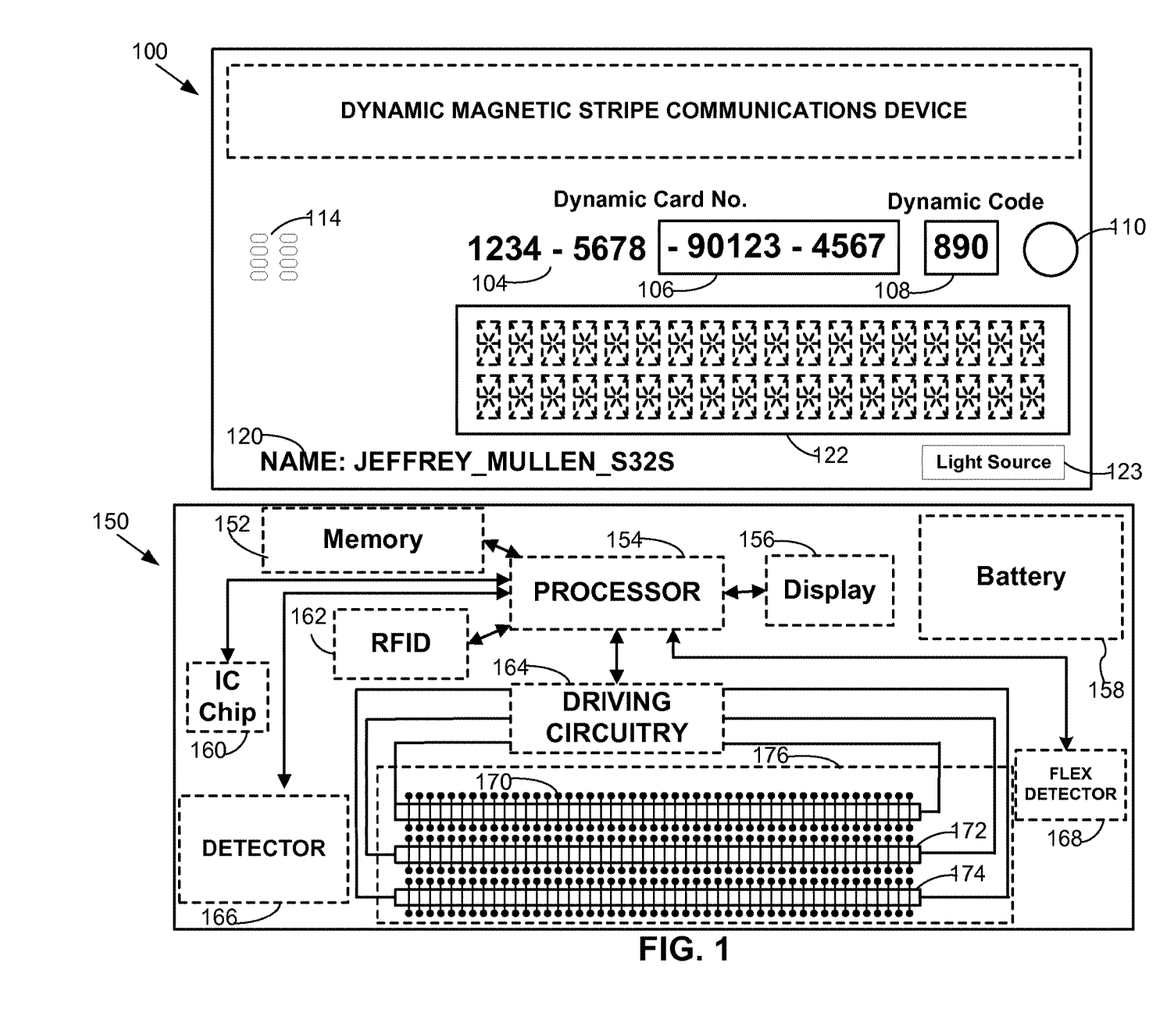
FIG. 1 is an illustration of a card constructed in accordance with the principles of the present invention.

FIG. 1 shows card 100. Referring to FIG. 1, a card 100 may include, for example, a dynamic number that may be entirely, or partially, displayed using a display (e.g., display 106). A dynamic number may include a permanent portion such as, for example, permanent portion 104 and a dynamic portion such as, for example, a number displayed by display 106. Card 100 may include a dynamic number having permanent portion 104 and permanent portion 104 may be incorporated on card 100 so as to be visible to an observer of card 100. For example, labeling techniques, such as printing, embossing, laser etching, etc., may be utilized to visibly implement permanent portion 104.

Card 100 may include a second dynamic number that may be entirely, or partially, displayed via a second display (e.g., display 108). Display 108 may be utilized, for example, to display a dynamic code such as a dynamic security code. Card 100 may also include third display 122 that may be used to display, for example, graphical information, such as logos and barcodes. Third display 122 may also be utilized to display multiple rows and/or columns of textual and/or graphical information.

Persons skilled in the art will appreciate that any one or more of displays 106, 108, and/or 122 may be implemented as a bi-stable display. For example, information provided on displays 106, 108, and/or 122 may be stable in at least two different states (e.g., a powered-on state and a powered-off state). Any one or more of displays 106, 108, and/or 122 may be implemented as a non-bi-stable display. For example, the display is stable in response to operational power that is applied to the non-bi-stable display. Other display types, such as LCD or electro-chromic, may be provided as well.

Other permanent information, such as permanent information 120, may be included with card 100, which may include user specific information, such as the cardholder's name or username. Permanent information 120 may, for example, include information that is specific to card 100 (e.g., a card issue date and/or a card expiration date). Information 120 may represent, for example, information that includes information that is both specific to the cardholder, as well as information that is specific to card 100.

Card 100 may accept user input data via any one or more data input devices, such as button 110. Button 110 may be included to accept data entry through, for example, mechanical distortion, contact, and/or proximity. Button 110 may be responsive to, for example, induced changes and/or deviations in light intensity, pressure magnitude, or electric and/or magnetic field strength. Such information exchange may then be determined and processed by a processor of card 100 as data input.

Card 100 may be flexible. Card 100 may, for example, contain hardware and/or software (e.g., flex code stored in memory 152) that when executed by a processor of card 100 may detect when card 100 is being flexed. Flex code may be, for example, processor executable applications and/or may be one or more application specific integrated circuits, that may detect a change in operation of card 100 based on the flexed condition of card 100 and may alter functions of card 100 based on the detected change in operation.

According to at least one example embodiment, a processor of card 100 may receive a signal from a distortion detection element indicating an amount of flexure of card 100. A distortion detection element may be, for example, a microelectricalmechanical system (MEMS), such as a MEMS capacitor. A degree of flexure may be determined according to a signal from the MEMS (e.g., a signal representing a capacitance of the MEMS capacitor). Light Source 123 may provide an indication to a user of the level of flexure of card 100 based on the MEMS signal. For example, light source 123 may be a multicolored light emitting diode (LED) emitting light during flexure of card 100. A color of light source 123 may indicate whether a degree of flexure may result in damage to card 100 (e.g., green for acceptable flexure, yellow for borderline flexure and red for potentially damaging flexure).

Card 100 may include a connector 114 (e.g., an EMV connector). Connector 114 may include, for example, 8 exposed connection pads. According to some example embodiments, connector 114 may include 6 connection pads. The number of connection pads of connector 114 is not limited and may be, for example, any number of connection pads.

One or more of the connection pads may be connected to, for example, a processor of card 100 (e.g., an embedded processor) and may be configured to connect with an external interface device (e.g., a universal serial bus interface device). For example, a connection pad may be a power connection supplying operating power to a processor of card 100 from an interface device. As another example, a connection pad may supply a clock signal to a processor of card 100 from an interface device. As still another example, a connection pad may supply a reset signal to a processor of card 100 from an interface device. As yet another example, a connection pad may provide a common ground between an interface device and card 100. As still yet another example, a connection pad may be a programming power connection to program a memory (e.g., an EEPROM) of card 100. As a further example, a connection pad may be an input/output (I/O) line for communications between an interface device and card 100 (e.g., a half-duplex communication channel). As yet a further example, a connection pad may be unused and reserved for future use.

For example, card 100 may include two unused connection pads (e.g., a card 100 with 8 connection pads) and/or no unused connection pads (e.g., a card 100 with 6 connection pads). Persons of ordinary skill in the art will appreciate that a number of connection pads of connector 114 may be increased or decreased based on an interface device and/or uses of card 100. Each connection pad of connector 114 may be, for example, electrically isolated from every other connection pad. According to at least one example embodiment, one or more of the connection pads may be connected.

Although FIG. 1 shows connector 114 on one side of card 100, connector 114 may be exposed on a different side or on multiple sides (e.g., either the front or back, or both). According to some example embodiments, multiple connectors 114 may be included in card 100, for example, on the same side, different sides, and/or the same and different sides.

Connector 114 may conform to, for example, the International Organization for Standardization (ISO) 7816 generally, and/or may partially conform to ISO 7816 (e.g., positioning on card 100). According to at least one example embodiment, card 100 may not conform to ISO 7816.

FIG. 1 shows architecture 150, which may include one or more processors (e.g., processor 154 which may be a plurality of stacked processors). Processor 154 may be configured to utilize external memory 152, internal memory of processor 154, or a combination of external memory 152 and internal memory for dynamically storing information, such as executable machine language (e.g., flex code), related dynamic machine data, and user input data values. Processor 154 may, for example, execute code contained within memory 152 to detect when a card (e.g., card 100 of FIG. 1) is being flexed. The executed code may, for example, change the operation of a card (e.g., card 100 of FIG. 1) based on the detected change in operation and/or indicate a flexure state to a user (e.g., light source 123 of FIG. 1).

Processor 154 may be a single die, or a combination of two or more die stacked on top of one another. A die may be a thin die attached to a thin and flexible substrate and/or to another die. For example, stacked dies may be flexibly adhered to a mechanical carrier (e.g., a flexible printed circuit board (PCB)), and to each other, using flexible, non-anaerobic, low ionic adhesive. A low ionic adhesive may be an adhesive that includes relatively little (e.g., less than about 20 ppm) or no ionic species that may affect device operation (e.g., migratory species in semiconductor devices) and/or that acts as a barrier to such ionic species.

One or more of the components shown in architecture 150 may be configured to transmit information to processor 154 and/or may be configured to receive information communicated by processor 154. For example, one or more displays 156 may be coupled to receive data from processor 154. The data received from processor 154 may include, for example, at least a portion of dynamic numbers and/or dynamic codes.

One or more displays 156 may be, for example, touch sensitive, signal sensitive and/or proximity sensitive. For example, objects such as fingers, pointing devices, and the like may be brought into contact with displays 156, or in proximity to displays 156. Objects such as light and/or sound emitting device may be aimed at displays 156. Detection of signals, object proximity or object contact with displays 156 may be effective to perform any type of function (e.g., communicate data to processor 154). Displays 156 may have multiple locations that are able to be determined as being touched, or determined as being in proximity to an object. As one non-limiting example, display 156 may be a thin film transistor (TFT) array (e.g., semiconductor oxide TFT array) configured to receive and emit light.

Input and/or output devices may be implemented on architecture 150. For example, integrated circuit (IC) chip 160 (e.g., an EMV chip) may be included within architecture 150, that may communicate information to a chip reader (e.g., an EMV chip reader). For example, chip 160 may be connected to, and communicate using, connection pads of a connector (e.g., contact communication) and/or an antenna (e.g., contactless communication). Chip 160 may or may not be connected to processor 154. For example, chip 160 may be an exposed chip and processor 154 may be an unexposed chip. Processor 154 may selectively determine information exposed via chip 160, for example, to improve security of card 100. Radio frequency identification (RFID) module 162 may be included within architecture 150 to enable the exchange of information with an RFID reader/writer.

Other input and/or output devices may be included within architecture 150, for example, to provide any number of input and/or output capabilities. For example, input and/or output devices may include an audio and/or light device operable to receive and/or communicate audible and/or light-based information. Input and/or output devices may include a device that exchanges analog and/or digital data using a visible data carrier. Input and/or output devices may include a device, for example, that is sensitive to a non-visible data carrier, for example, an infrared data carrier or an electromagnetic data carrier.

Flex detector 168 may detect flexure of a device (e.g., card 100). For example, flex detector 168 may include a distortion detection element operable to detect an amount of flexure of a device. Flex detector 168 may be, for example, a MEMS detector, piezoelectric element, detection circuitry, and/or the like.

Persons skilled in the art will further appreciate that a card (e.g., card 100 of FIG. 1) may, for example, be a self-contained device that derives its own operational power from one or more batteries 158. One or more batteries 158 may be included, for example, to provide operational power for a period of time (e.g., approximately 2-4 years). One or more batteries 158 may be included, for example, as rechargeable batteries.

Electromagnetic field generators 170-174 of dynamic magnetic stripe communications device 176 may be included within architecture 150 to communicate information to, for example, a read-head of a magnetic stripe reader via, for example, electromagnetic signals. For example, electromagnetic field generators 170-174 may be included to communicate one or more tracks of electromagnetic data to read-heads of a magnetic stripe reader. Electromagnetic field generators 170-174 may include, for example, a series of electromagnetic elements. Each electromagnetic element may be implemented as a coil encircling one or more materials (e.g., a magnetic material and/or a non-magnetic material). Additional materials may be outside the coil (e.g., a magnetic material and/or a non-magnetic material).

Electrical excitation by processor 154 of one or more coils of one or more electromagnetic elements via, for example, driving circuitry 164 may generate electromagnetic fields from the one or more electromagnetic elements. One or more electromagnetic field generators 170-174 may be utilized to communicate electromagnetic information to, for example, one or more read-heads of a magnetic stripe reader.

Timing aspects of information exchange between architecture 150 and the various I/O devices implemented within architecture 150 may be determined by processor 154 and/or by an external interface device connected to card 100. Detector 166 may be utilized, for example, to sense the proximity and/or actual contact, of an external device, which in turn, may trigger the initiation of a communication sequence. The sensed presence and/or touch of the external device may then be communicated to a controller (e.g., processor 154), which in turn may direct the exchange of information between architecture 150 and the external device. The sensed presence and/or touch of the external device may be effective to, for example, determine the type of device or object detected.

For example, the detection may include the detection of a read-head of a magnetic stripe reader. In response, processor 154 may activate one or more electromagnetic field generators 170-174 to initiate a communications sequence with, for example, one or more read-heads of a magnetic stripe reader. The timing relationships associated with communications between one or more electromagnetic field generators 170-174 and one or more read-heads of a magnetic stripe reader may be based on a detection of the magnetic stripe reader. As another example, the detection may include detection of an interface device connected to chip 160 (e.g., via exposed connection pads of card 100).

Persons skilled in the art will appreciate that processor 154 may provide user-specific and/or card-specific information through utilization of one or more buttons (e.g., button 110), connector 114, RFID 162, IC chip 160, electromagnetic field generators 170-174, and/or other input and/or output devices.

Figure 2:
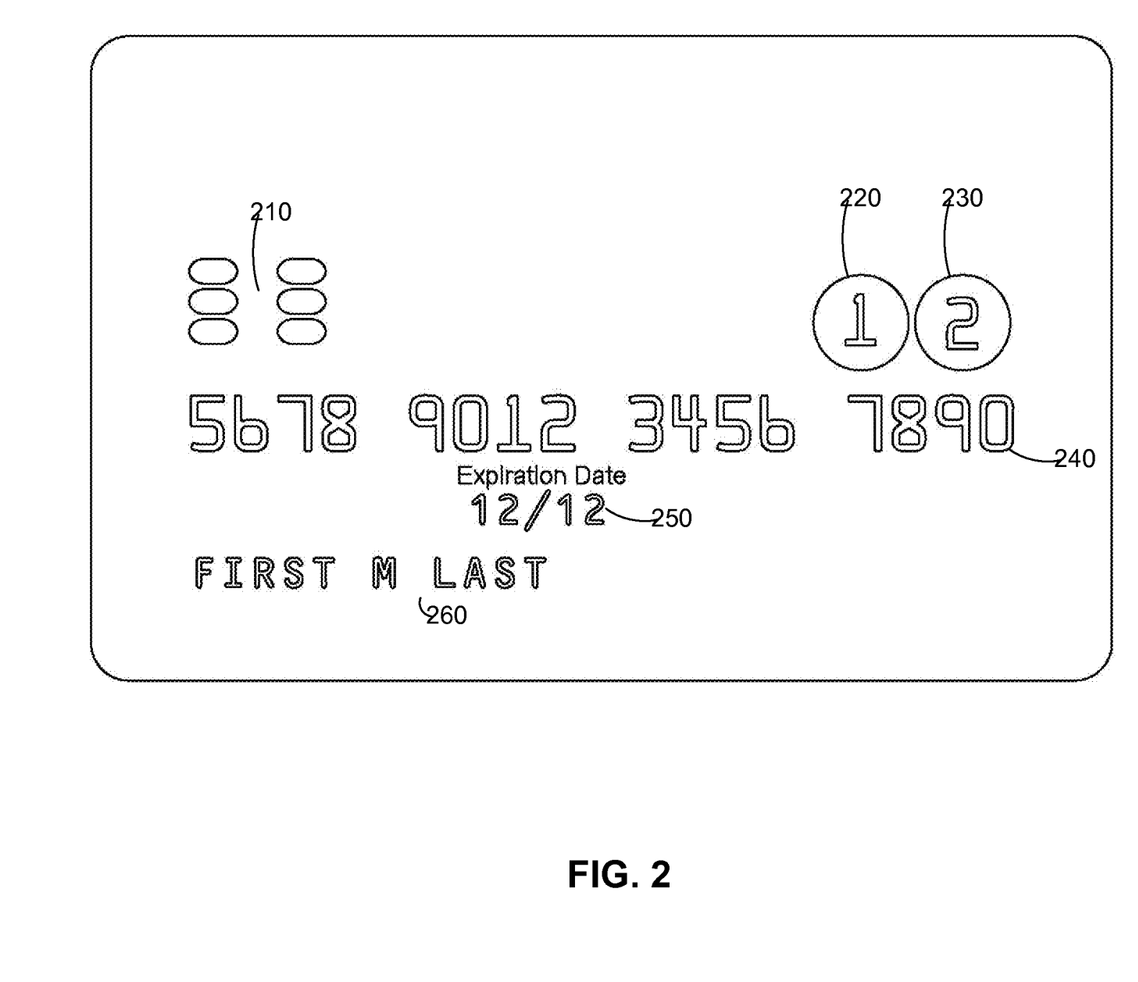
FIG. 2 is an illustration of a card constructed in accordance with the principles of the present invention.

FIG. 2 is an illustration of a card constructed in accordance with the principles of the present invention. Referring to FIG. 2, card 200 may include connector array 210, buttons 220 and 230, and information 240, 250 and 260.

Card 200 may include a connector array 210 (e.g., an EMV connector). Connector array 210 may include, for example, 6 discrete connectors. Each discrete connector may be exposed on a surface of card 200. According to some example embodiments, each discrete connector may include contact pads on the surface of card 200.

One or more of the discrete connectors may connect an external interface device (e.g., a universal serial bus interface device) to card 200. For example, a discrete connector may be a power connection supplying operating power to a processor (not shown) of card 200 from an interface device. As another example, a discrete connector may supply a clock signal to a processor of card 200 from an interface device. As still another example, a discrete connector may supply a reset signal to a processor of card 200 from an interface device. As yet another example, a discrete connector may provide a common ground between an interface device and card 200. As still yet another example, a discrete connector may be a programming power connection used to program a memory (not shown) of card 200. As a further example, a discrete connector may be an input/output (I/O) pad used for communications between an interface device and card 200 (e.g., a half-duplex communication channel).

The discrete connectors of connector array 210 may be communicatively connected (e.g., electrically connected) to land patterns (e.g., conductive pads) (not shown) on one or more boards, for example, a flexible printed circuit board (not shown) of card 200. The discrete connectors may extend from the one or more boards through, for example, vias and/or routing paths. The vias and/or routing paths may extend through outer layers on a surface of card 200 to expose the discrete connectors. Connector array 210 may connect card 200 to a contact reader, for example, an EMV reader.

According to at least one other example embodiment, connector array 210 may include a conventional EMV contact structure. The discrete connectors of connector array 210 may be formed on the contact structure by an additive process, for example, adding additional connective material (e.g., conductive material) and adding a non-connective material around the connective material. Persons of ordinary skill in the art will appreciate that other processes are within the scope of example embodiments. For example, an etch and/or damascene process.

Each discrete connector of connector array 210 may be, for example, electrically isolated from every other discrete connector. According to at least one example embodiment, one or more of the discrete connectors may be connected. Connector array 210 may include, for example, aluminum, nickel, gold, copper, silicon, palladium silver, palladium gold, platinum, platinum silver, platinum gold, tin, kovar (e.g., nickel-cobalt ferrous alloy), stainless steel, iron, ceramic, brass, conductive polymer, zinc and/or carbide.

Although FIG. 2 shows connector array 210 on one side of card 200, connector array 210 may be exposed on a different side or on multiple sides of card 200 (e.g., either the front or back, or both). Multiple connectors 210 may be included on card 200. Connector array 210 may conform to the International Organization for Standardization (ISO) 7816 generally, and/or may partially conform to ISO 7816 (e.g., positioning on card 200). According to at least one example embodiment, card 200 may not conform to ISO 7816.

A shape of the discrete connectors of connector array 210, and/or the exposed portions of the discrete connectors, may be any shape. For example, the discrete connectors, and/or the exposed portions of the discrete connectors, may be square, rectangular, oval, semi-circular, triangular, quadrilateral and/or circular. The shape of the discrete connectors may be stylized, for example, star shaped, shield shaped, shaped as a natural object (e.g., an apple), as a logo (e.g., a corporate logo) and/or any other shape. Each discrete connector may include more than four sides (e.g., hexagonally shaped). According to at least one example embodiment, each connector may be shaped as a rectangle with rounded corners and/or ends. According to some example embodiments, one, some or all of the discrete connectors, and/or the exposed portion of the discrete connectors, may be shaped differently.

Card 200 may include buttons 220 and 230. Card 200 may provide user-specific and/or card-specific information upon utilization of one or more of buttons 220 and 230. Card 200 may include one or more displays (not shown). Card 200 may include information 240, 250 and 260. For example, information 240 may be, for example, an embossed and/or printed account number. Information 250 may be, for example, an expiration date associated with card 200. Information 260 may be, for example, a name of a cardholder.

Figure 3:
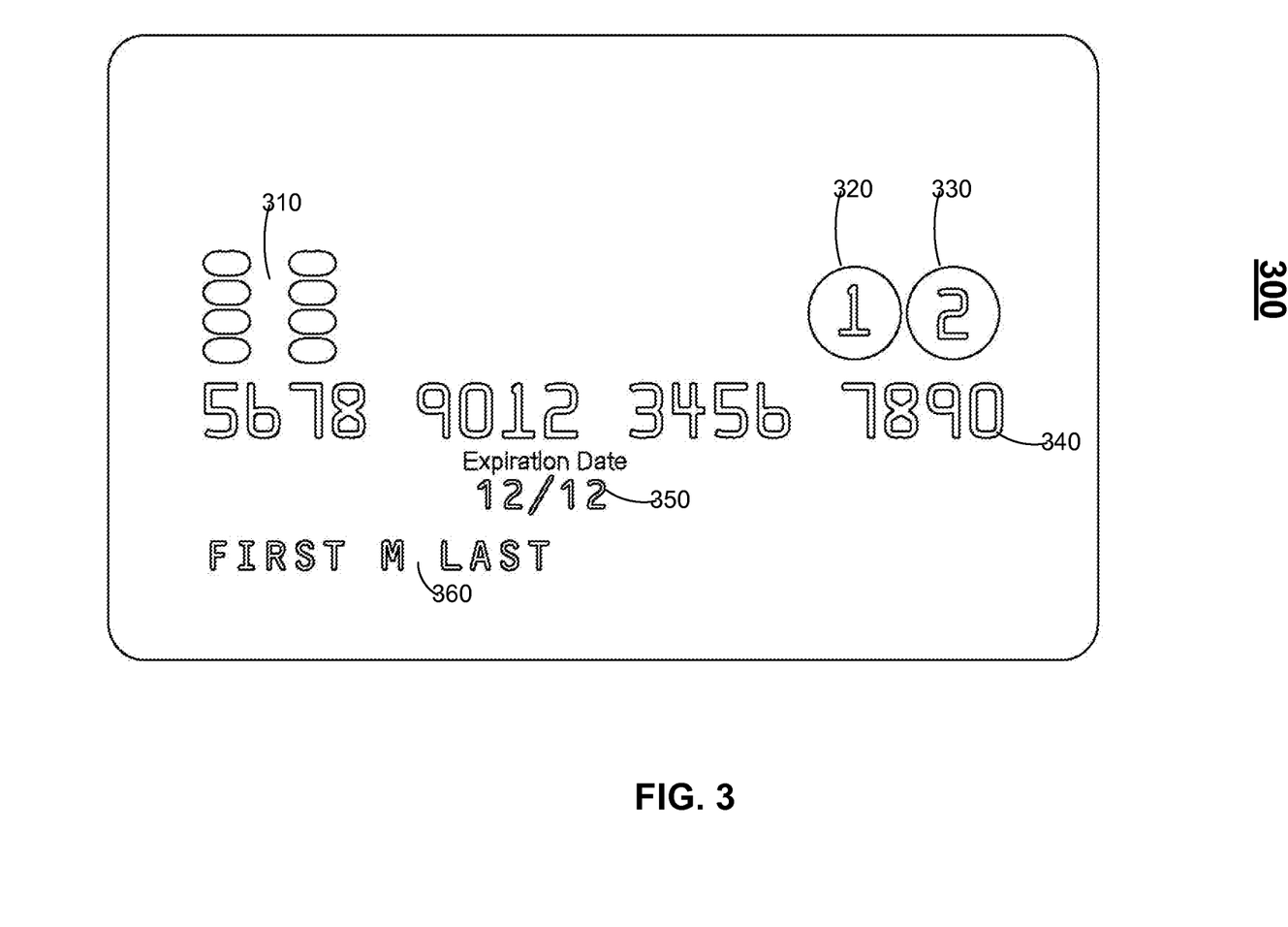
FIG. 3 is an illustration of a card constructed in accordance with the principles of the present invention.

FIG. 3 is an illustration of a card constructed in accordance with the principles of the present invention. Referring to FIG. 3, card 300 may include connector array 310, buttons 320 and 330, and information 340, 350 and 360.

Card 300 may include a connector array 310 (e.g., an EMV connector). Connector array 310 may include, for example, 8 discrete connectors. Each discrete connector may be exposed on a surface of card 300. According to some example embodiments, each discrete connector may include contact pads on the surface of card 200.

One or more of the discrete connectors may connect an external interface device (e.g., a universal serial bus interface device) to card 300. For example, a discrete connector may be a power connection supplying operating power to a chip (not shown) of card 300 from an interface device. As another example, a discrete connector may supply a clock signal to a chip of card 300 from an interface device. As still another example, a discrete connector may supply a reset signal to a chip of card 300 from an interface device. As yet another example, a discrete connector may provide a common ground between an interface device and card 300. As still yet another example, a discrete connector may be a programming power connection used to program a memory (not shown) of card 300. As a further example, a discrete connector may be an input/output (I/O) pad used for communications between an interface device and card 300 (e.g., a half-duplex communication channel). As yet a further example, one or more of the discrete connectors may be unused and reserved for future use.

The discrete connectors of connector array 310 may be communicatively connected (e.g., electrically connected) to land patterns (e.g., conductive pads) (not shown) on one or more boards, for example, a flexible printed circuit board (not shown) of card 300. The discrete connectors may extend from the one or more boards through, for example, vias and/or routing paths. The vias and/or routing paths may extend through outer layers on a surface of card 300 and the discrete connectors may be exposed on a surface of card 300. Connector array 310 may connect card 300 to a contact reader, for example, an EMV reader.

According to at least one other example embodiment, connector array 310 may include a conventional EMV contact structure. The discrete connectors of connector array 310 may be formed on the contact structure by an additive process, for example, adding additional connective material (e.g., conductive material) and adding a non-connective material around the connective material. Persons of ordinary skill in the art will appreciate that other processes are within the scope of example embodiments. For example, an etch and/or damascene process.

Each discrete connector of connector array 310 may be, for example, electrically isolated from every other discrete connector. According to at least one example embodiment, one or more of the discrete connectors may be connected. Connector array 310 may include, for example, a conductor. For example, discrete connectors may include aluminum, nickel, gold, copper, silicon, palladium silver, palladium gold, platinum, platinum silver, platinum gold, tin, kovar (e.g., nickel-cobalt ferrous alloy), stainless steel, iron, ceramic, brass, conductive polymer, zinc and/or carbide.

Although FIG. 3 shows connector array 310 on one side of card 300, connector array 310 may be exposed on a different side or on multiple sides of card 300 (e.g., either the front or back, or both). Multiple connectors 310 may be included on card 300. Connector array 310 may conform to the International Organization for Standardization (ISO) 7816 generally, and/or may partially conform to ISO 7816 (e.g., positioning on card 300). According to at least one example embodiment, card 300 may not conform to ISO 7816.

A shape of the discrete connectors of connector array 310, and/or the exposed portions of the discrete connectors, may be any shape. For example, the discrete connectors, and/or the exposed portions of the discrete connectors, may be square, rectangular, oval, semi-circular, triangular, quadrilateral and/or circular. The shape of the discrete connectors may be stylized, for example, star shaped, shield shaped, shaped as a natural object (e.g., an apple), as a logo (e.g., a corporate logo) and/or any other shape. Each discrete connector may include more than four sides (e.g., hexagonally shaped). According to at least one example embodiment, each connector may be shaped as a rectangle with rounded corners and/or ends. According to some example embodiments, one, some or all of the discrete connectors, and/or the exposed portion of the discrete connectors, may be shaped differently.

Card 300 may include buttons 320 and 330. Card 300 may provide user-specific and/or card-specific information upon utilization of one or more of buttons 320 and 330. Card 300 may include one or more displays (not shown). Card 300 may include information 340, 350 and 360. For example, information 340 may be, for example, an embossed and/or printed account number. Information 350 may be, for example, an expiration date associated with card 300. Information 360 may be, for example, a name of a cardholder.

Figure 4:
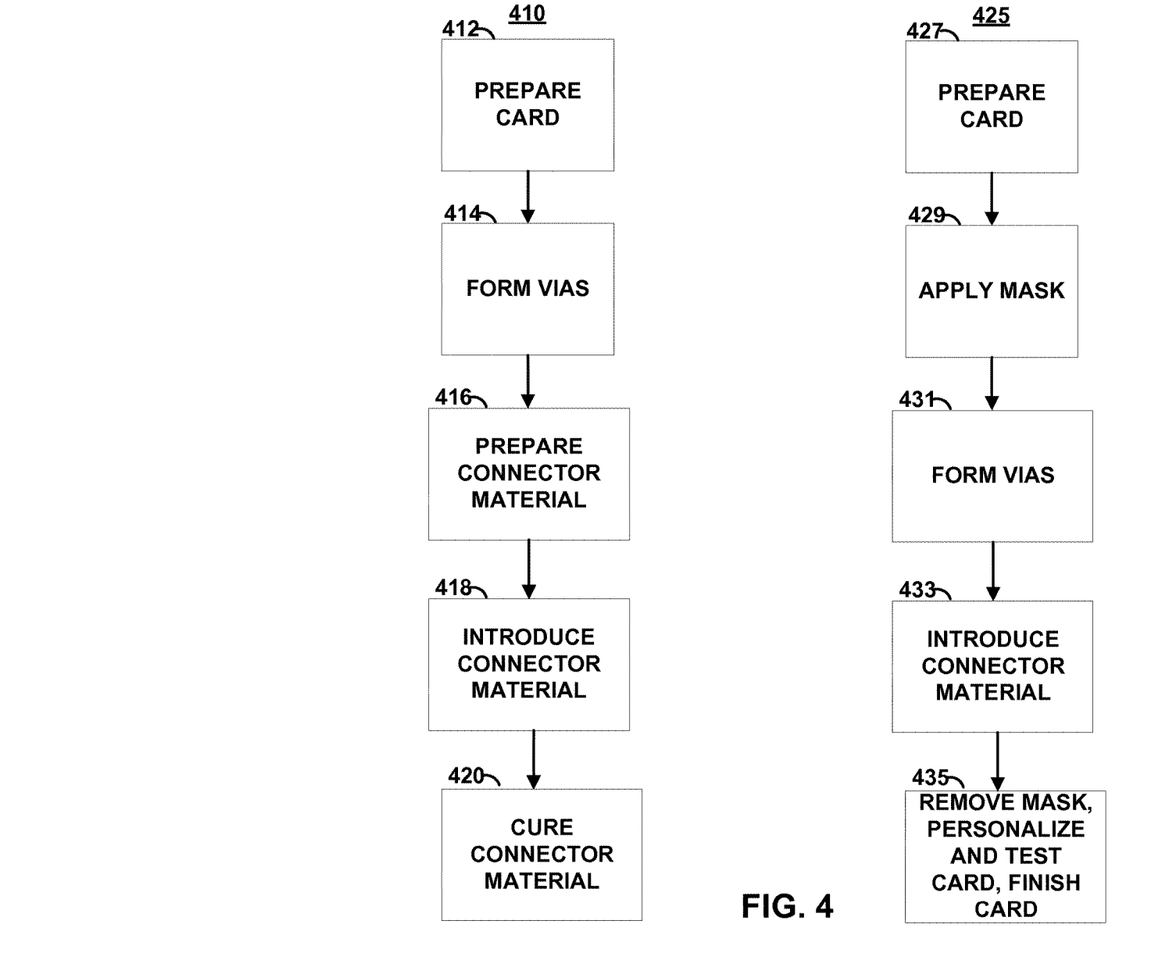
FIG. 4 illustrates process flow charts constructed in accordance with the principles of the present invention.

FIG. 4 illustrates process flow charts constructed in accordance with the principles of the present invention. Referring to Referring to FIG. 4, sequence 410 may include, for example, preparing a card (e.g., as in step 412). The card may include a circuit board (e.g., a flexible printed circuit board) with a conductive landing pad, and one or more layers on the board. At least one via (e.g., 6 or 8 vias) may be formed in the one or more layers to expose the landing pad (e.g., as in step 414). For example, a digitally controlled carbon dioxide laser including 'Galvo' mirrors may be programmed, and may etch a selected number of vias through the outer layer (e.g., plastic outer layer) of the card. The laser may etch through other materials if present, for example, an adhesive system used to bond the outer layer to the circuit board. A shape of each via may be programmed and the laser may etch each via in any shape.

A depth and shape of the vias may be determined to decrease and/or minimize damage to a contact area of the landing pad. The landing pad may be, for example, gold plated. The laser may be programmed such that residue from the etched material is removed to improve adhesion and electrical conductivity. Each via etched into the card may be, for example, a vertical tube between the surface of the card and the landing pads on the circuit board.

A connector material may be prepared (e.g., as in step 416). The connector material may include, for example, one or more conductive materials. Each of the materials may include, for example, aluminum, nickel, gold, copper, silicon, palladium silver, palladium gold, platinum, platinum silver, platinum gold, tin, kovar (e.g., nickel-cobalt ferrous alloy), stainless steel, iron, ceramic, brass, conductive polymer, zinc and/or carbide.

The connector material may include, for example, an epoxy system. The one or more connector materials may be blended into a matrix with an epoxy system. The epoxy system may be, for example, either a "1 part system" or a "2 part system." The epoxy system may be cured using ambient moisture and/or air, thermally cured and/or reaction base cured using resin and a hardener. An epoxy system may be selected based on conductive durability, physical durability, electrical durability, abrasion resistance, chemical resistance, scalability and cost.

The connector material may be introduced into the vias (e.g., as in step 418) to form discrete connectors from landing pads to about the surface of the card. For example, a robotically controlled dispensing method may be used to fill and/or partially fill each individual via. According to at least one example embodiment, the connector material may be deposited into each via such that a cured surface of the conductor film is at about a finished card surface and/or a pad is formed at about a finished card surface. According to at least one example embodiment, a level of the cured surface may be determined based on ISO standards for EMV physical dimensions and/or subsequent processing.

As another example, the connector film may be forced hydraulically into the vias and then cured (e.g., 'stencil printing').

The connector material may be cured (e.g., as in step 420). Curing may improve physical and electrical properties of the epoxy system. Pads formed with the connector material at the card surface may be above that required by ISO standards for a finished card. According to some example embodiments, a mechanized abrading system may be used to true up the surface of the pads and bring them to the target height (e.g., a height required to accommodate the printing process and meet ISO height standards).

Sequence 425 may include, for example, preparing a card (e.g., as in step 427). The card may include an electronics package between card layers, for example, transparent plastic card layers. A mask (e.g., a stencil) may be applied to the card (e.g., as in step 429). The mask may be, for example, any type of mask. For example, the mask may be a paper or cardboard mask.

At least one via (e.g., 6 or 8 vias) may be formed through the mask and at least one layer of the card to expose a landing pad of a board (e.g., as in step 431). For example, the mask and the card layer may be etched (e.g., using a laser) to form at least one via including openings in the mask, any card layers and any other materials between the mask and the landing pad. A connector material may be introduced into the at least one via (e.g., as in step 433) through the etched portions of the mask. The connector material may fill and/or partially fill the via to form a connector from the landing pad to about the outside surface of the mask.

The mask may be removed, and the card personalized, tested and finished (e.g., as in step 435). For example, the mask may be removed to expose an outer surface of the card and at least one connector protruding above the outer surface. Personalization may include, for example, providing color, graphics and/or information to an outer surface of the card. At least one personalization layer may be applied to the card until an outer surface of the at least one connector is at about the level of an outer surface of the card (e.g., the card including the personalization layer). For example, the card may be printed with one or more materials (e.g., a plurality of layers) until the printed material is about flush with the outer surface of the connector. The printing may be, for example, drop-on-demand printing.

According to some example embodiments, a material removal process may be used to lower the outer surface of the connector in a case where the connector is not flush and protrudes from the outer surface of the personalization layer. The material removal process may include a planar polish and/or the use of a mechanized abrading system.

Personalization of the card may include, for example, programming the card. Programming according to example embodiments may occur while a personalization layer is being applied to the card. For example, the card may be programmed during a drop-on-demand printing process using a communication device of the card. Programming may include communicating with, for example, one or more inductive sensors (e.g., read-head sensors), one or more dynamic magnetic stripe communications devices, one or more infrared communications devices, an RFID, an IC chip, and/or any other communication device.

According to at least one example embodiment, a material of the personalization layer may be a conductive communication path with the at least one connector. The card may be programmed during application of the personalization layer by communicating signals through the material of the personalization layer. Signals may be communicated, for example, to a processor, memory and/or IC chip via the material of the personalization layer and the at least one connector.

The card may be tested. Components of the card may be triggered to verify operation of the card. Any communication device may be activated. Test results may be communicated through the communication device and/or testing may include verifying operation of the communication device.

Testing of the card may occur, for example, after programming and during application of the personalization layer. According to some example embodiments, both programming and testing may be performed while the card is printed.

Persons skilled in the art will appreciate that the present invention is not limited to only the example embodiments described. Instead, the present invention more generally involves dynamic information and the exchange thereof. Features described with respect to an example embodiment may be utilized in different example embodiments. Persons skilled in the art will also appreciate that the apparatus of the present invention may be implemented in other ways than those described herein. All such modifications are within the scope of the present invention, which is limited only by the claims that follow.

What is claimed is:

1. A card, comprising:
   a connector array including a plurality of discrete connectors exposed on a surface of the card, wherein the discrete connectors are separated by at least a personalization layer;
   a dynamic magnetic stripe communications device operable to communicate to a read-head of a magnetic stripe reader; and
   at least one processor coupled to at least one of the plurality of discrete connectors, the processor being operable to be programmed and tested from an external source via the at least one of the plurality of discrete connectors, the processor being further coupled to the dynamic magnetic stripe communications device to cause the dynamic magnetic stripe communications device to communicate magnetic stripe payment information from the card, the personalization layer comprising a conductive communication path with at least one of the discrete connectors.

2. The card of claim 1, wherein the discrete connectors of the connector array are arranged in rows and columns.

3. The card of claim 1, wherein the material of the personalization layer comprises a conductive communication path with at least one of the discrete connectors.

4. A method, comprising:
   applying a personalization layer to a card; and
   programming a dynamic magnetic stripe communications device within the card to enable the dynamic magnetic stripe communications device to be operable to communicate payment information to a read-head of a magnetic stripe reader during the applying a personalization layer, wherein the personalization layer comprises a conductive communication path with at least one discrete connector.

5. The method of claim 4, further comprising testing the dynamic magnetic stripe communications device within the card during the applying a personalization layer.

6. A method, comprising:
   applying a personalization layer to a card; and
   testing a dynamic magnetic stripe communications device within the card to enable the dynamic magnetic stripe communications device to be operable to communicate payment information to a read-head of a magnetic stripe reader during the applying a personalization layer, wherein the personalization layer comprises a conductive communication path with at least one discrete connector.

* * * * *